United States Patent [19]

Buckley et al.

[11] 4,086,012

[45] Apr. 25, 1978

[54] ROTATIONAL ENERGY ABSORBING COUPLING

[75] Inventors: William H. Buckley, Rockville, Md.; Garnett Ryland, II, Warsaw, Va.

[73] Assignee: The United States of America as represented by the Secretary of the Navy, Washington, D.C.

[21] Appl. No.: 724,807

[22] Filed: Sep. 20, 1976

[51] Int. Cl.² ............................................... B63B 1/28
[52] U.S. Cl. ........................................ 403/2; 64/28 R; 188/1 C; 403/337; 114/279
[58] Field of Search ................... 403/2, 337, 335, 336, 403/DIG. 3; 64/DIG. 1, 28 R; 188/1 C; 114/279

[56] References Cited

U.S. PATENT DOCUMENTS

| | | | |
|---|---|---|---|
| 292,095 | 1/1884 | Carlson | 403/336 |
| 2,566,690 | 9/1951 | Wright | 64/28 R |
| 2,845,144 | 7/1958 | Bohn | 188/1 C |
| 3,060,706 | 10/1962 | Hess | 64/28 R |
| 3,185,120 | 5/1965 | Bader | 114/282 |
| 3,342,155 | 9/1967 | Hook | 114/280 |
| 3,405,541 | 10/1968 | Whitfield et al. | 64/28 R |
| 3,910,215 | 10/1975 | Soderman | 114/279 |
| 4,010,705 | 3/1977 | Connell et al. | 114/279 |

OTHER PUBLICATIONS

N.R.L. Report 5797 entitled "Effect of Chamfered Holes on the Resistance of Bolts and Dowels to Shock Loads in Shear", dated Jul. 9, 1962, I. Vigness, E. R. Seibert, H. M. Forkois.

*Primary Examiner*—Andrew V. Kundrat
*Attorney, Agent, or Firm*—R. S. Sciascia; Q. E. Hodges

[57] ABSTRACT

A rotational energy absorbing coupling for shaft-to-shaft and shaft-to-crank applications such as a tiller arm for a steerable strut for hydrofoil ship using a plurality of shear pins spaced in a circular pattern. A first, inner disc is affixed to one shaft and has a circular repeating sequential pattern of a round hole, and a plurality of slots of increasing length all chamfered at the edges. At least a second disc or outer disc are connected to the other coaxial shaft or crank with extended arms and, when more than one is used are sandwiched over the first disc. These discs have a circular pattern of round holes chamfered at the edges and in register with the holes and the center of the slots of the inner disc. A plurality of axially aligned shear pins pass through all the aligned holes thus providing progressive bending of the shear pins due to the chamfered holes, then the shearing of the pins when an overload occurs. The arrangement allows the energy to be absorbed by the plastic deformation (in either direction) of the shear pins in the chamfered holes.

5 Claims, 2 Drawing Figures

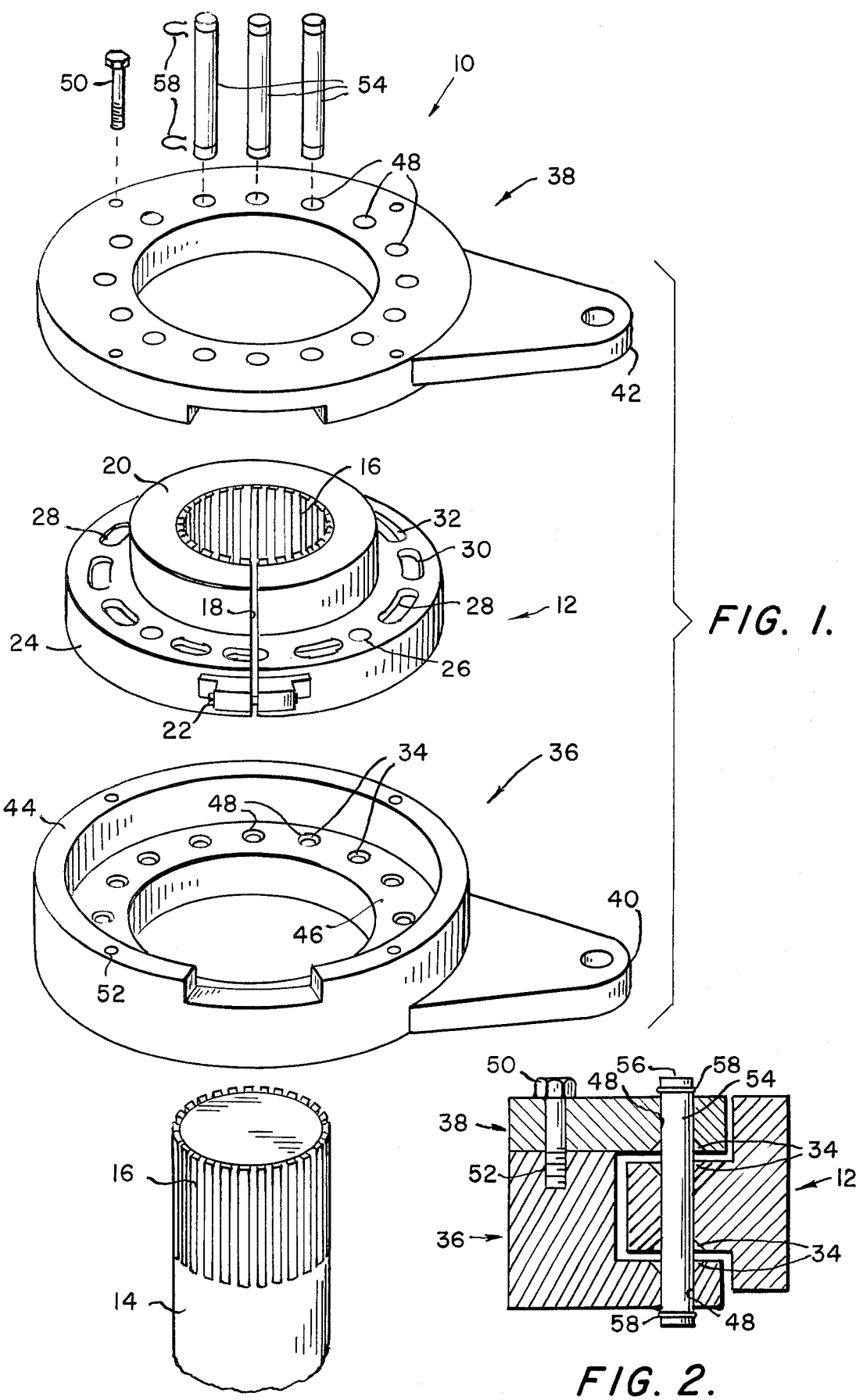

ROTATIONAL ENERGY ABSORBING COUPLING

The invention described herein may be manufactured and used by or for the Government of the United States of America for governmental purposes without the payment of any royalties thereon or therefor.

BACKGROUND OF THE INVENTION

This invention relates to rotational energy absorbing couplings, and more particularly to shaft-to-crank arm coupling for a tiller arm. The device will absorb part of the energy of impact of fully submerged steerable strut-foil system of hydrofoil ships which may encounter submerged logs, large fish, and debris. These impacts have often resulted in steering actuator failures which then produced large rolling and yawing motions as a result of uncontrolled forward strut rotation. After the steering actuator fails only limit stops would prevent strut-foil rotation.

Studies conducted on hydrofoil ships determined that the debris impact load was impulsive in nature, and there was no provision of energy absorbing devices. Therefore, absorption of the foil-strut rotational energy, built up during the impact, would have to be the primary function of a device to prevent failure of the steering actuator. It was found that if the actuator did fail, high lateral bending loads could be experienced by the strut due to hydrodynamic loads as a result of large rotations. These high lateral bending loads in the strut can present significant hazards to the ship and personnel, for example the strut may break off. Prior art rotational couplings generally use shear pin arrangements which are bulky and which merely shear to avoid catastrophic damage to other components, but do not absorb energy to any particular degree before their total failure in shear. They also require immediate replacement and repair before continued operation.

SUMMARY OF THE INVENTION

Briefly the instant invention overcomes the diadvantages of the prior art shear pin couplings by providing a bi-directional rotational energy absorbing coupling for example in the form of a shaft-to-shaft or shaft-to-crank coupling, using a plurality of shear pins that bend before shearing in holes and slots thus allowing some relative motion without loss of control. The pins pass through the center of the slots to provide energy absorption in both directions of movement. One disc is affixed to one shaft, and a pair of discs are connected to the other shaft or crank arm and are sandwiched over the first disc.

The shock energy absorption is achieved by the combination of a plurality of axially aligned shear pins passing through the chamfered holes of the sandwiched discs, which chamfers allow bending before shearing of the pins. Also the holes are in register from disc to disc and are in a circular repeating sequential pattern of a round hole, and a plurality slots of increasing length along the arc thus allowing progressive bending and shearing in both directions as each pin sequentially reaches the limit of its slot. Thus the coupling absorbs rotational energy of the strut assembly due to an impact near the outer end of the attached foil.

STATEMENT OF THE OBJECTS OF THE INVENTION

Accordingly, an object of the invention is to provide a new, improved, and reliable rotational energy absorbing coupling using sequentially sheared shear pins.

Another object of the instant invention is to provide a rotational energy absorbing coupling, using shear pins, that allow some relative motion between the elements of the coupling before shearing of the pins.

Still another object of the present invention is to provide a compact rotational energy absorbing coupling able to absorb high impact forces.

BRIEF DESCRIPTION OF THE DRAWINGS

A more complete understanding of the invention and many of the attendant advantages thereto will be apparent from the following detailed description when considered in conjunction with the accompanying drawings, wherein:

FIG. 1 is an isometric, exploded view of the rotational energy absorbing coupling; and FIG. 2 is a cross-sectional view showing a typical shear pin in a chamfered hole, connecting three discs.

DESCRIPTION AND OPERATION OF THE PREFERRED EMBODIMENT

Referring now to the drawings wherein like reference numerals refer to the same element throughout the several views, there is shown in FIG. 1, generally a rotational energy absorbing coupling 10, having a disc 12 which is secured as with splines to a shaft 14, which may be the kingpost of a rudder or a steerable strut.

The disc 12 includes a splined collar 20 and a flange 24, with the splines 16 of collar 20 mating with those of the shaft 14. Disc 12 is split at 18 to allow the collar 20 to be clamped tightly to the shaft 14 by the clamping bolt 22. Bolt 22 is shown merely for convenience passing through a lug on the flange periphery which extends into an opening of the outer discs, but forms no part of the invention. Shown integral with the collar 20 is the flange 24, formed to extend radially outwardly of the collar having axial holes in a uniaxial circular repeating sequential pattern of a round hole 26, a short slot 28, a medium slot 30, and a long slot 32, or in other words a plurality of slots of increasing length. Each slot has a chamfer 34 on its ends at its top and bottom sides and at an angle of 45°.

Above and below the inner disc 12, as is shown in the exploded view, are outer discs 36 and 38, which may be secured to another coaxial shaft in a manner similar to that of the inner disc, or the outer discs 36, 38 may have crank arms 40, 42 formed thereon as shown. As shown, the bottom outer disc 36 has an upstanding rim 44 that encompasses the flange 24 attached to a flange 46. Both outer discs 36 and 38 have a circular pattern of round holes 48, with chamfers 34 at their inner edges at an angle of 45° adjacent to and in register with the holes 26 and the center of the slots 28, 30, 32 of the flange 24 of the inner disc 12. The top 38 and bottom 36 outer discs, sandwiching the inner disc 12, are fastened together as for example by screw fasteners 50 threaded into holes 52 in the upstanding rim 44 of the bottom disc 36.

Referring now to FIG. 2, there is shown in more detail, a shear pin 54 passing through a representative hole of the axially aligned, in register, circular repeating sequentially pattern of holes and slots.

The shear pins 54 have radial grooves 56 at each end to accept snap rings 58 therein to preclude the shear pins dropping out. Alternative means may be cross-holes drilled in each end of the pins to accept cotter pins, or the like. The shear pins have a clearance fit with the holes of about 0.001 – 0.003 inch. Further the pins in the slots will pass through the center of each of the slots 28, 30, 32 in the flange 24 to allow energy absorption in either rotational direction.

Operation of the rotational energy absorbing coupling is described as follows in relation to a steerable strut or rudder tiller arm, but it is to be understood that the coupling finds application when any axially-aligned shaft-to-shaft rotational energy absorption is desired. When the foil of the strut-foil particularly the tip, hits debris in the water, high impact loads are transferred through the strut to the energy absorbing coupling 10. The shear pins 54 psssing through the round holes 48 to 26 to 48 start to shear, at which point the pins passing through the short slots 48 to 28 to 48 just come into contact at the end of the slot 28 thus adding resistance to rotation. If the combined resisting forces are exceeded at this first point, the shear pins in 48 to 26 to 48 shear, and the pins in 48 to 28 to 48 bend. At this second point the pins passing through the next longer slot 48 to 30 to 48 just come into contact at the end of the slot 30. If the impact load has not yet been absorbed, the shear pins in 48 to 28 to 48 shear, the pins in 48-30-48 bend in their chamfers, and the pins passing through 48 to 32 to 48 come into contact at the end of the slot 32 at this third point. It is hoped at this third point, that the impact load has been absorbed, otherwise the pins in 48-30-48 shear and the pins in 48-32-48 bend in their chamfers leaving only the latter to shear. Thus an impact load is absorbed by allowing approximately 15° of relative rotation in the rotational energy absorbing coupling through the progressive bending then shearing of a plurality of shear pins in a sequential order.

Obviously, many modifications and variations of the present invention are possible in light of the above teachings. For example a single second disc held closely to the first disc may replace the sandwiched inner and outer discs. It is therefore to be understood that within the scope of the appended claims, the invention may be practiced otherwise than as specifically described.

What is claimed is:

1. A rotational energy absorbing coupling for shaft-to-crank arm applications comprising:
   first disc means affixed to a shaft, the first disc means comprising an inner disc which has a collar portion adapted to be secured against rotation relative to the shaft, a flange portion formed radially outwardly from said collar portion, and a uniaxial circular pattern of holes in said flange portion;
   second disc means adjacent said first disc means and connected to a rotation means, said second disc means comprising a pair of outer discs, one on either side of said flange portion of said inner disc so as to envelope said inner disc and a uniaxial circular pattern of holes in said pair of outer discs and in register with said uniaxial circular pattern of holes in said flange portion of said inner disc;
   a plurality of yieldable means connecting said first and second disc means, said yieldable means being adapted to sequentially bend and then shear to absorb an impact load.

2. The rotational energy absorbing coupling of claim 1 wherein said plurality of yieldable means comprises:
   chamfers in each of said holes in a uniaxial pattern at each adjacent surface of said inner disc flange portion and said outer discs; and
   a plurality of shear pins passing through the center of each of said holes in register.

3. The rotational energy absorbing coupling of claim 2 wherein said plurality of yieldable means further comprises:
   a sequential pattern of a round hole, and a plurality of slots of increasing length, whereby energy can be absorbed in both directions.

4. The rotational energy absorbing coupling of claim 3 wherein said sequential pattern of holes is:
   a uniaxial circular repeating sequential pattern.

5. The rotational energy absorbing coupling of claim 4 wherein said chamfers comprise:
   a 45° chamfer around each round hole, and at least around the ends of each slot.

* * * * *